(12) United States Patent
Arai

(10) Patent No.: US 12,498,736 B2
(45) Date of Patent: Dec. 16, 2025

(54) INFORMATION OUTPUT METHOD, MOBILE OBJECT CONTROL SYSTEM, AND RECORDING MEDIUM

(71) Applicant: Panasonic Intellectual Property Management Co., Ltd., Osaka (JP)

(72) Inventor: Toshiya Arai, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 108 days.

(21) Appl. No.: 18/541,738

(22) Filed: Dec. 15, 2023

(65) Prior Publication Data
US 2024/0126300 A1    Apr. 18, 2024

Related U.S. Application Data

(63) Continuation of application No. PCT/JP2022/006242, filed on Feb. 16, 2022.

(30) Foreign Application Priority Data

Jun. 28, 2021 (JP) .................. 2021-107140

(51) Int. Cl.
G05D 1/644    (2024.01)
G05D 1/698    (2024.01)
G05D 105/28   (2024.01)

(52) U.S. Cl.
CPC .......... *G05D 1/644* (2024.01); *G05D 1/6987* (2024.01); *G05D 2105/28* (2024.01)

(58) Field of Classification Search
CPC .. G05D 1/644; G05D 1/6987; G05D 2105/28; G01C 21/343; G01C 21/34;
(Continued)

(56) References Cited

U.S. PATENT DOCUMENTS 10,860,986 B2 * 12/2020 Suzuki .................. H04W 4/029
12,032,379 B1 *  7/2024 Copeland ........... G01C 21/3484
(Continued)

FOREIGN PATENT DOCUMENTS

JP    2018-149669    9/2018
JP    2020-85577     6/2020
(Continued)

OTHER PUBLICATIONS

International Search Report (ISR) issued on Apr. 19, 2022 in International (PCT) Application No. PCT/JP2022/006242.

*Primary Examiner* — Ashley L Redhead, Jr.
(74) *Attorney, Agent, or Firm* — Wenderoth, Lind & Ponack, L.L.P.

(57) ABSTRACT

An information generation method is an information output method executed by a mobile retail vehicle control device (information output device) and includes obtaining first information about a first time at which a first mobile object arrives at a first arrival point (first point); determining, based on the first information, a second point from which a second mobile object can arrive at the first arrival point at a second time within a predetermined period from the first time; and outputting instruction information for moving the second mobile object to the second point.

20 Claims, 6 Drawing Sheets

(58) Field of Classification Search
CPC ............... G06Q 30/0205; G06Q 50/10; G06Q 10/1093; G06Q 10/047; G06Q 10/0631; G06Q 10/083; G06Q 50/40; G06Q 10/08; G06Q 10/08355; G06Q 30/0201; G06Q 30/0202; G06Q 30/06; G08G 1/123
See application file for complete search history.

(56) References Cited

U.S. PATENT DOCUMENTS

| | | |
|---|---|---|
| 2020/0218281 A1 | 7/2020 | Ono |
| 2021/0287158 A1* | 9/2021 | Yamaguchi .......... G06Q 10/087 |
| 2023/0147258 A1* | 5/2023 | Nishimura ......... G01C 21/3676 |
| | | 701/533 |

FOREIGN PATENT DOCUMENTS

| | | |
|---|---|---|
| JP | 2021-121887 | 8/2021 |
| JP | 2021-149785 | 9/2021 |
| WO | 2018/038085 | 3/2018 |
| WO | 2018/168536 | 9/2018 |
| WO | 2019/039014 | 2/2019 |

* cited by examiner

INFORMATION OUTPUT METHOD, MOBILE OBJECT CONTROL SYSTEM, AND RECORDING MEDIUM

CROSS REFERENCE TO RELATED APPLICATIONS

This is a continuation application of PCT International Application No. PCT/JP2022/006242 filed on Feb. 16, 2022, designating the United States of America, which is based on and claims priority of Japanese Patent Application No. 2021-107140 filed on Jun. 28, 2021. The entire disclosures of the above-identified applications, including the specifications, drawings and claims are incorporated herein by reference in their entirety.

FIELD

The present invention relates to an information output method, a mobile object control system, and a recording medium.

BACKGROUND

In recent years, more attempts have been made to enable automatic control of artificial devices. For example, a technology of causing robots to automatically implement control similar to that implemented by humans using machine learning has been disclosed so far (see Patent Literature (PTL) 1).

CITATION LIST

Patent Literature

[PTL 1] Japanese Unexamined Patent Application Publication No. 2018-149669

SUMMARY

Technical Problem

In a case where mobile objects in particular are used as the artificial devices, appropriately determining routes along which such mobile objects travel is known to be difficult.
The present disclosure provides an information output method and the like for appropriately determining routes along which mobile objects travel.

Solution to Problem

An information output method according to an aspect of the present invention is an information output method executed by an information output device, and includes obtaining first information about a first time at which a first mobile object arrives at a first point; determining, based on the first information, a second point from which a second mobile object can arrive at the first point at a second time within a predetermined period from the first time; and outputting instruction information for moving the second mobile object to the second point.

Note that these general or specific aspects may be achieved by systems, apparatuses, integrated circuits, computer programs, or computer-readable recording media, such as CD-ROMs, or may be achieved by any combinations of systems, apparatuses, integrated circuits, computer programs, and recording media.

Advantageous Effect

The information output method of the present disclosure can output information for appropriately determining routes along which mobile objects travel.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENT

Underlying Knowledge Forming Basis of the Present Disclosure

The inventor of the present disclosure found that the following problems arose regarding the technology of automatic control (that is, autonomous travel or autonomous movement) of mobile objects described in the section of "Background Art".

In an example use where mobile objects simply go around along predetermined shuttle routes, for example, the autonomous movement of the mobile objects can be achieved relatively easily. On the other hand, the example use of the mobile objects that can autonomously move includes provision of on-road services, such as delivery of articles, mobile sales, guarding, advertisement, cleaning, disinfection, inspection, and heating, and provision of in-vehicle services, such as babysitting, medical treatment, food and drink, workshops, lodging, hot baths, and studios, using the interiors of the mobile objects. In the above-described uses, for example, in a case where the mobile objects are used for delivery and mobile sales in combination, the inventor of the present disclosure found that determining the travel route of a second mobile object for mobile sales from the travel history of a first mobile object for delivery enabled the second mobile object to be moved efficiently. Specifically, a request of mobile sales by the second mobile object can be received from a user or the like located at a delivery destination to which the first mobile object has moved for delivery, and the second mobile object can be dispatched to the delivery destination as needed. Thus, delivery destinations that require the second mobile object can be efficiently found.

At this moment, the first mobile object and the second mobile object do not need to bear any particular relation to each other. The first mobile object need only be, for example, a shuttle vehicle that goes around in a wide area to provide services or that simply goes around in a wide area without providing services. The services may include, not only delivery of articles, but home care, mobile sales, and mobile advertisement, for example. In addition, the example use of the first mobile object includes the above-described example use of the mobile objects that can autonomously move, that is, provision of on-road services, such as delivery of articles, mobile sales, guarding, advertisement, cleaning, disinfection, inspection, and heating, and provision of in-vehicle services, such as babysitting, medical treatment, food and drink, workshops, lodging, hot baths, and studios, using the interiors of the mobile objects. The second mobile object visits users who have learned the services provided by the second mobile object through the first mobile object only when the users require the second mobile object to be dispatched. Thus, the utilizer of the second mobile object can spread out the services efficiently.

Moreover, as another example use of the mobile objects that can autonomously move, the inventor of the present disclosure found that determining the travel route of a second mobile object for maintenance or emergency repair of a first mobile object for delivery and the like from the travel history of the first mobile object enabled the second mobile object to be moved efficiently. Specifically, a request for maintenance by the second mobile object can be received from the first mobile object that is moving along a route for delivery, and the second mobile object can be dispatched to the route of the first mobile object as needed. Thus, the second mobile object can be dispatched immediately at a required timing.

In particular, in case of trouble that prevents the first mobile object from traveling, the first mobile object may need to stop at a dangerous area (first point in this example), such as an intersection, a narrowed road, or an accident-prone point, on the route of the first mobile object and may cause a serious accident. To avoid this, when the first mobile object approaches such a dangerous area, the second mobile object is sent to a location (including the second point) from which the second mobile object can be dispatched to the dangerous area in a short time. Thus, if the first mobile object needs to stop in the dangerous area, the second mobile object can arrive immediately to provide maintenance or emergency repair, reducing the risk.

The dispatch of the second mobile object here may be triggered by the fact that the first mobile object is scheduled to pass through the dangerous area or by a change in conditions regarding the service by the first mobile object. The change in the conditions regarding the service by the first mobile object includes, for example, that in conditions of pedestrians around the first mobile object in a security service, conditions of facilities to be inspected in an inspection service, and conditions of the floor around the first mobile object in a cleaning service. To use such a change in the conditions regarding the service by the first mobile object as a trigger, for example, images are captured using a camera installed in the first mobile object and recognized using an AI recognition system (for example, whether or not to be recognized). Moreover, signs of trouble in the first mobile object may also be used as a trigger. That is, in this example, the second mobile object is dispatched automatically according to, for example, the state of the first mobile object.

Here, there is a possibility that the user reconsiders the dispatch of the second mobile object after the first mobile object visits the user and before the second mobile object arrives at the user in response to a request to dispatch (that is, move) the second mobile object. Accordingly, it is desirable that the second mobile object arrives at the user before the user reconsiders the dispatch of the second mobile object while the second mobile object is being dispatched. The period from when the first mobile object visits the user to when the user reconsiders the dispatch of the second mobile object may be expressed as "predetermined period" in the present disclosure. Note that "reconsidering the dispatch of the second mobile object" means that the user feels the service provided along with the dispatch of the second mobile object is complicated. As a result, the user may feel the usability of the service provided along with the dispatch of the second mobile object is low, avoid using the service from the next time, or cancel the provision of the service at that point. If more users reconsider the service, the value of the service provided along with the dispatch of the second mobile object itself may decrease. To avoid this, it is important for the dispatch of the second mobile object not to cause the user to reconsider.

The predetermined period above is a period determined by the characteristics of the user and the type of the service provided by the second mobile object. For example, in a case where the user is patient and where the service provided by the second mobile object is a type of visiting service, such as day care, for example, the predetermined period may be assumed to be a few days. On the other hand, in a case where the user is impatient and where the service provided by the second mobile object is a type of mobile sales of articles, for example, the predetermined period may be assumed to be a few minutes to tens of minutes (for example, one, two, three, four, five, six, seven, eight, nine, or ten minutes). In particular, articles of a type required immediately, such as daily necessities, may cause the user to reconsider more readily. In a case where the service is reconsidered in such a short period, the predetermined period may be determined statistically or may be determined uniquely for each user.

Moreover, in the case where the first mobile object performs deliveries while the second mobile object conducts mobile sales, for example, the predetermined period may be set such that the user can purchase articles along with the delivery. Such a predetermined period is a period that allows the user to receive a delivery from the first mobile object and immediately to purchase articles from the second mobile object without other tasks. That is, it is desirable that the user who puts on their shoes at the entrance to receive the delivery can purchase the articles without removing their shoes. Such a predetermined period is, for example, a few minutes to tens of minutes.

After the arrival of the first mobile object, the second mobile object is required to move with as little wasted movement as possible to arrive within the predetermined period. Such movement cannot be achieved only by following a scheduled route, such as a shuttle route, in consideration of the ever-changing state of the first mobile object and differences between standby bases (warehouses and the like where goods are loaded) of the first mobile object and the second mobile object, for example. Furthermore, in a case where there are multiple first mobile objects and second mobile objects less than the first mobile objects, the above-described problem becomes more significant. Accordingly, the present disclosure provides an information output method capable of outputting information for appropriately determining routes along which mobile objects travel and a mobile object control system and the like including an information output device that executes the information output method.

To solve the above-described problem, an information output method according to an aspect of the present disclosure is an information output method executed by an information output device, and includes obtaining first information about a first time at which a first mobile object arrives at a first point; determining, based on the first information, a second point from which a second mobile object can arrive at the first point at a second time within a predetermined period from the first time; and outputting instruction information for moving the second mobile object to the second point.

Such an information generation method causes the second mobile object to move to the second point from which the second mobile object can move to the first point at a time point within the predetermined period not long after the first time, based on the information about the first time at which the first mobile object arrives at the first point. As a result, the second mobile object can move to the first point within the predetermined period from the first time at any timing. For example, mobile objects may be controlled such that the second mobile object may further be moved to the first point only in a case where a certain condition is met when the first mobile object arrives at the first point. Thus, according to the information output method, even when it cannot be determined whether such a condition is met in advance, instruction information for appropriately determining the route along which the second mobile object travels in view of capability to move the second mobile object to the first point within the predetermined period from the first time can be output.

Moreover, for example, the first mobile object may be loaded with a first article scheduled in advance to be delivered to the first point, and the second mobile object may be loaded with a second article expected to be purchased by a user.

According to this, the instruction information for appropriately determining the route along which the second mobile object travels using the first mobile object loaded with the first article scheduled in advance to be delivered to the first point and the second mobile object loaded with the second article expected to be purchased by the user can be output.

Moreover, for example, the instruction information may include route information about a location of the first point, a location of the second point, and a route from a current location to the first point via the second point.

According to this, the second mobile object can travel along the route appropriately determined according to the route information about the location of the first point, the location of the second point, and the route from the current location to the first point via the second point included in the instruction information.

Moreover, for example, the route to the first point may be selected from a plurality of candidate routes from the current location to the first point via the second point, based on information about one or more points at which the first mobile object is scheduled to arrive after the first point.

According to this, the route along which the second mobile object travels is determined based on the information about the one or more points at which the first mobile object is scheduled to arrive after the first point. For example, the route to the first point can be determined appropriately in advance such that the second mobile object can further move to the next one or more points easily when the need to move the second mobile object to the first point is negated while the second mobile object is moving along the route to the first point.

Moreover, for example, as the route to the first point, a candidate route with lowest travel cost may be selected from the plurality of candidate routes from the current location to the first point via the second point, the travel cost being required for the second mobile object to arrive at at least one of the one or more points at which the first mobile object is scheduled to arrive after the first point.

According to this, the route along which the second mobile object travels is determined based on the information about the one or more points at which the first mobile object is scheduled to arrive after the first point. For example, the route to the first point can be determined appropriately in advance such that the travel cost required for the second mobile object to further move to the next one or more points is minimized when the need to move the second mobile object to the first point is negated while the second mobile object is moving along the route to the first point.

Moreover, for example, the route to the first point may be selected from a plurality of candidate routes from the current location to the first point via the second point, based on information about arrival of the first mobile object at the first point.

According to this, the route along which the second mobile object travels is determined based on the information about the arrival of the first mobile object at the first point. For example, the route of the second mobile object can be appropriately determined using the fact that the first mobile object has actually arrived at the first point.

Moreover, for example, the route to the first point may be selected from the plurality of candidate routes from the current location to the first point via the second point, based on a temporal relationship between a timing at which the first mobile object arrives at the first point and a timing at which a request to move the second mobile object to the first point is received from a user located at the first point.

According to this, the route along which the second mobile object travels is determined based on the information about the arrival of the first mobile object at the first point. For example, when the request to move the second mobile object to the first point is received without the intervention of the first mobile object, that is, before the first mobile object arrives at the first point, the second mobile object can be moved to the first point with the shortest route from the beginning. Moreover, for example, when the request to move the second mobile object to the first point is received through the first mobile object, that is, at a timing when the first mobile object arrives at the first point, the second mobile object may follow the shortest route to the first point after the request is received. Accordingly, the route does not need to be the shortest route to the first point at least until the request to move the second mobile object to the first point is received, and the travel route can be appropriately determined from a viewpoint different from the shortest route to the first point, for example, from a viewpoint of route selection in consideration of standby at the second point and points to which the first mobile object moves after the first point.

Moreover, for example, the route to the first point may be selected from a plurality of candidate routes from the current location to the first point via the second point, based on information about past purchase histories of a plurality of users respectively located at two or more points at which the first mobile object is scheduled to arrive.

According to this, the route along which the second mobile object travels is determined based on the information about the past purchase histories of the plurality of users respectively located at the two or more points at which the first mobile object is scheduled to arrive. For example, users to be given higher priority, for example, users expected to make purchases from the second mobile object can be selected based on the past purchase histories, and the second mobile object can be moved to the points where those users are located easily.

Moreover, for example, as the route to the first point, a candidate route with lowest travel cost may be selected from the plurality of candidate routes from the current location to the first point via the second point, the travel cost being required for the second mobile object to arrive at a point where a user with a highest purchase expectation value is located, the purchase expectation value being calculated from the past purchase histories of the plurality of users respectively located at the two or more points at which the first mobile object is scheduled to arrive.

According to this, the route along which the second mobile object travels is determined based on the information about the past purchase histories of the plurality of users respectively located at the two or more points at which the first mobile object is scheduled to arrive. For example, users to be given higher priority, for example, users with the highest purchase expectation values calculated from the past purchase histories can be selected, and the second mobile object can be moved to the points where those users are located at the minimum travel cost.

Moreover, for example, the instruction information may further include information about a standby period during which the second mobile object stops moving at the second point to enable the second mobile object to arrive at the first point at the second time.

According to this, the second mobile object can be put on standby for the standby period at the second point from which the second mobile object can arrive at the first point at the second time. For example, in a case where the user located at the first point is unlikely to submit a request to move the second mobile object to the first point is low and where users given higher priority are located at other points, the second mobile object can be prevented from moving too close to the first point. This contributes to a reduction in the movement, to be "wasted", of the second mobile object.

Moreover, for example, the second mobile object may be selected from a plurality of mobile objects, based on a state of the first mobile object.

According to this, the second mobile object suitable for the state of the first mobile object can be selected from the plurality of mobile objects to be moved.

Moreover, for example, the first mobile object may present information about a service provided by the second mobile object to a user located at the first point when the first mobile object arrives at the first point.

According to this, the user can choose whether the second mobile object needs to be moved using the information presented to the user located at the first point.

Moreover, for example, when a request to move the second mobile object to the first point in response to the information presented by the first mobile object that has arrived at the first point is received from the user located at the first point to provide the user with the service, the instruction information further including information for moving the second mobile object to the first point may be output.

According to this, the user can choose whether the second mobile object needs to be moved using the information presented to the user located at the first point. Moreover, because the second mobile object can be moved to the first point after the request to move the second mobile object to the first point is received from the user located at the first point, the travel route can be appropriately determined by, for example, route selection in consideration of standby at the second point and points to which the first mobile object moves after the first point until the request to move the second mobile object to the first point is received.

Moreover, for example, when the request to move the second mobile object to the first point in response to the information presented by the first mobile object that has arrived at the first point is not received from the user located at the first point within a certain period, the instruction information for moving the second mobile object to the first point may be discarded.

According to this, the user can choose whether the second mobile object needs to be moved using the information presented to the user located at the first point. Moreover, when the request to move the second mobile object to the first point is not received from the user located at the first point within the certain period, the first point can be removed from the destinations of the second mobile object assuming that the user located at the first point will not submit the request to move the second mobile object to the first point. Thus, the travel route of the second mobile object can be appropriately determined with points other than the first point set as the destinations.

Moreover, for example, the predetermined period may be a period determined according to at least one of a type of a service provided by the second mobile object or a characteristic of a user located at the first point, and may be a period after the user located at the first point submits a request to move the second mobile object to the first point after the first time to provide the user with the service and before the user located at the first point reconsiders the provision of the service.

According to this, the travel route of the second mobile object can be appropriately determined such that the second mobile object arrives at the first point before the user located at the first point reconsiders the provision of the service.

Moreover, a recording medium according to an aspect of the present disclosure is a non-transitory computer-readable recording medium having recorded thereon a program for causing a computer to execute the information output method described above.

According to this, effects similar to those of the information generation method described above can be produced.

Moreover, a mobile object control system according to an aspect of the present disclosure includes the information output device described above, the first mobile object, and the second mobile object.

According to this, effects similar to those of the information output method described above can be produced.

Note that these general or specific aspects may be achieved by systems, apparatuses, integrated circuits, computer programs, or computer-readable recording media, such as CD-ROMs, or may be achieved by any combinations of systems, apparatuses, integrated circuits, computer programs, and recording media.

Hereinafter, an embodiment will be described in detail with reference to the drawings.

Note that the embodiment described below illustrates a general or specific example. The numerical values, shapes, materials, elements, positions and connections of the elements, steps, order of steps, and the like shown in the following embodiment are mere examples and are not intended to limit any aspect of the present invention. Moreover, those elements, in the following embodiment, that are not recited in an independent claim, which defines the most generic concept, are described as optional.

Embodiment

First, a configuration of a mobile object control system according to this embodiment will be described.

Figure 1:
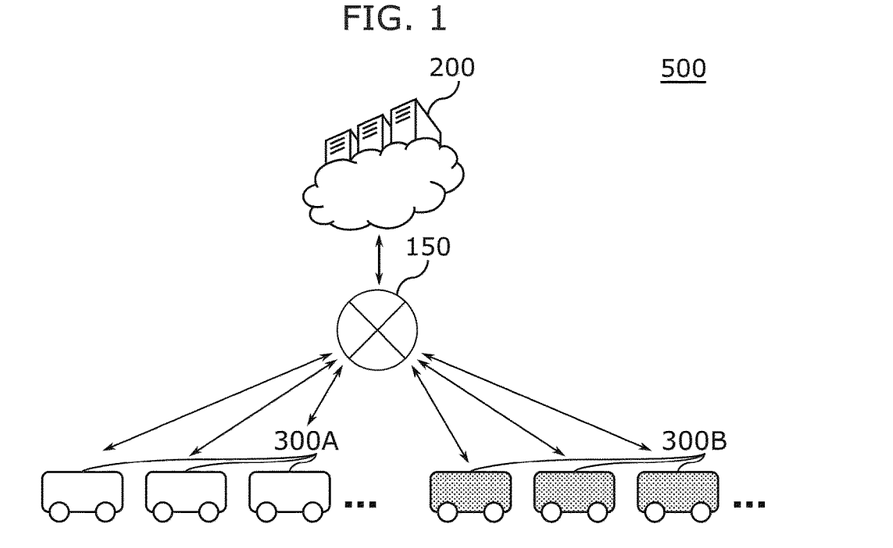
FIG. 1 schematically illustrates a configuration of a mobile object control system according to an embodiment.
Figure 2:
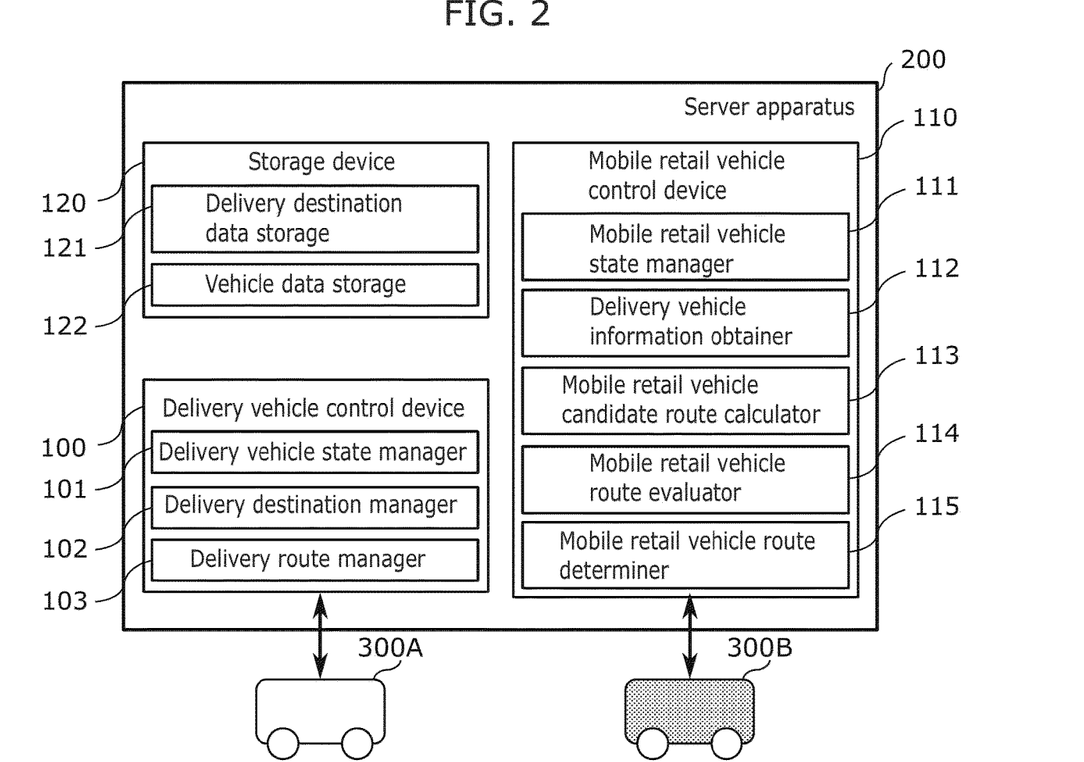
FIG. 2 schematically illustrates a functional configuration of the mobile object control system according to the embodiment.

FIG. 1 schematically illustrates the configuration of the mobile object control system according to the embodiment. Moreover, FIG. 2 schematically illustrates a functional configuration of the mobile object control system according to the embodiment.

As illustrated in FIG. 1, mobile object control system 500 according to this embodiment is achieved by multiple first mobile objects 300A, multiple second mobile objects 300B, and server apparatus 200 connected to the mobile objects through network 150.

In this embodiment, first mobile objects 300A are mobile objects that are loaded with first articles to be delivered to first arrival point 401 where a first user is located and that deliver the first articles. Accordingly, first mobile objects 300A move among points where multiple users including first user 401 are respectively located in the order scheduled in advance. Moreover, second mobile objects 300B are mobile objects that are loaded with second articles expected to be purchased by users and that conduct mobile sales (merchandise sales) of the second articles. Hereinafter, first mobile objects 300A and second mobile objects 300B may be collectively referred to as "mobile objects". Moreover, although multiple mobile objects are illustrated in the drawings, during actual use, the operation is achieved by combinations of one of multiple first mobile objects 300A and one of multiple second mobile objects 300B at a point in time. That is, the numbers of first mobile objects 300A and second mobile objects 300B in mobile object control system 500 may be respectively one.

The mobile objects are devices that can autonomously travel, such as automobiles, robots, drones, bicycles, and wheelchairs, and are used for, for example, delivering goods while being loaded with the goods. The mobile objects each include a motor or the like that serves as power; a driven unit, such as wheels, driven by the motor; and a functional unit that accumulates a power source (for example, electric power) for operating the power.

Network 150 is a communications network for connecting the mobile objects and server apparatus 200 such that the mobile objects and server apparatus 200 can communicate with each other. Network 150 here is, but not limited to, a communications network, such as the Internet. Moreover, the connection between the mobile objects and network 150 and the connection between server apparatus 200 and network 150 may be either wireless or wired. The mobile objects may be connected to network 150 wirelessly because of the nature thereof.

Server apparatus 200 is an apparatus for processing information and the like and is achieved using, for example, a processor and memory. Server apparatus 200 may be achieved by edge computing or by cloud computing. Moreover, one server apparatus 200 may be provided for one mobile object, or one server apparatus 200 may be provided for multiple mobile objects.

As illustrated in FIG. 2, server apparatus 200 includes delivery vehicle controller 100, mobile retail vehicle controller 110, and storage device 120. Delivery vehicle control device 100 is achieved by the processor and the memory of server apparatus 200 and controls the movement of first mobile objects 300A. Moreover, mobile retail vehicle control device 110 is achieved by the processor and the memory of server apparatus 200 and controls the movement of second mobile objects 300B. Storage device 120 is a device, such as semiconductor memory, for storing various data used in delivery vehicle control device 100 and mobile retail vehicle control device 110.

Delivery vehicle control device 100 includes delivery vehicle state manager 101, delivery destination manager 102, and delivery route manager 103. Moreover, mobile retail vehicle control device 110 includes delivery vehicle information obtainer 111, mobile retail vehicle state manager 112, mobile retail vehicle candidate route calculator 113, mobile retail vehicle route evaluator 114, and mobile retail vehicle route determiner 115. Moreover, storage device 120 includes delivery destination data storage 121 and vehicle data storage 122.

Delivery vehicle state manager 101 is a processor that obtains a vehicle state of each first mobile object 300A by communicating with first mobile object 300A through network 150. The vehicle state includes information about whether first mobile object 300A is traveling or at rest, about the location and speed of first mobile object 300A, about whether first mobile object 300A is delivering articles, and the like. In addition, the vehicle state includes information for dispatching second mobile object 300B received by first mobile object 300A from a user (information about a request to move second mobile object 300B). The received vehicle state is stored in vehicle data storage 122.

Delivery destination manager 102 obtains delivery destination data indicating when and at what point which articles need to be delivered by accessing delivery destination data storage 121. Delivery destination manager 102 creates a delivery instruction in which available first mobile object 300A and the delivery destination data are associated with each other on the basis of the delivery destination data and the vehicle state, and stores the delivery instruction in vehicle data storage 122.

Delivery route manager 103 reads out the vehicle state and the delivery destination data associated with first mobile object 300A corresponding to the vehicle state to create a delivery plan indicating a route to the delivery destination and a travel instruction on the road according to the delivery plan. Delivery route manager 103 sends the created travel instruction to first mobile object 300A through network 150. First mobile object 300A delivers articles according to the travel instruction that first mobile object 300A has received. Moreover, delivery route manager 103 stores a route plan that delivery route manager 103 has created in vehicle data storage 122.

Mobile retail vehicle state manager 111 is a processor that obtains a vehicle state of each second mobile object 300B by communicating with second mobile object 300B through network 150. The vehicle state includes information about whether second mobile object 300B is traveling or at rest, about the location and speed of second mobile object 300B, about whether second mobile object 300B is conducting mobile sales, and the like. The received vehicle state is stored in vehicle data storage 122.

Delivery vehicle information obtainer 112 reads out the delivery destination data associated with first mobile object 300A, the route plan, and the vehicle state, and sends them to mobile retail vehicle candidate route calculator 113.

Mobile retail vehicle candidate route calculator 113 calculates one or more candidate routes of second mobile object 300B on the basis of the information about first mobile object 300A received from delivery vehicle information obtainer 112 and the vehicle state of second mobile object 300B. The candidate routes are routes each leading from the current location of second mobile object 300B to the delivery destination (the first arrival point or the first point) for which first mobile object 300A is heading for delivery.

Mobile retail vehicle route evaluator 114 evaluates each of the one or more calculated candidate routes in view of travel cost including the delivery destination data associated with first mobile object 300A and the like, and adds evaluation information to each candidate route. The candidate routes with the evaluation information are sent to mobile retail vehicle route determiner 115.

Mobile retail vehicle route determiner 115 determines a candidate route determined to be appropriate from the one or more candidate routes in view of travel cost and the like. The travel cost will be described in detail later. Subsequently, mobile retail vehicle route determiner 115 outputs instruction information for moving second mobile object 300B along the determined route. Accordingly, mobile retail vehicle control device 110 is an example of an information output device. The output instruction information includes route information about the location of first arrival point 401, the location of a standby point (described later), and the route from the current location to the first arrival point via the standby point. The instruction information is sent to second mobile object 300B through network 150.

Second mobile object 300B that has received the instruction information travels autonomously according to the instruction information, thereby moving automatically in an appropriate manner.

Figure 3:
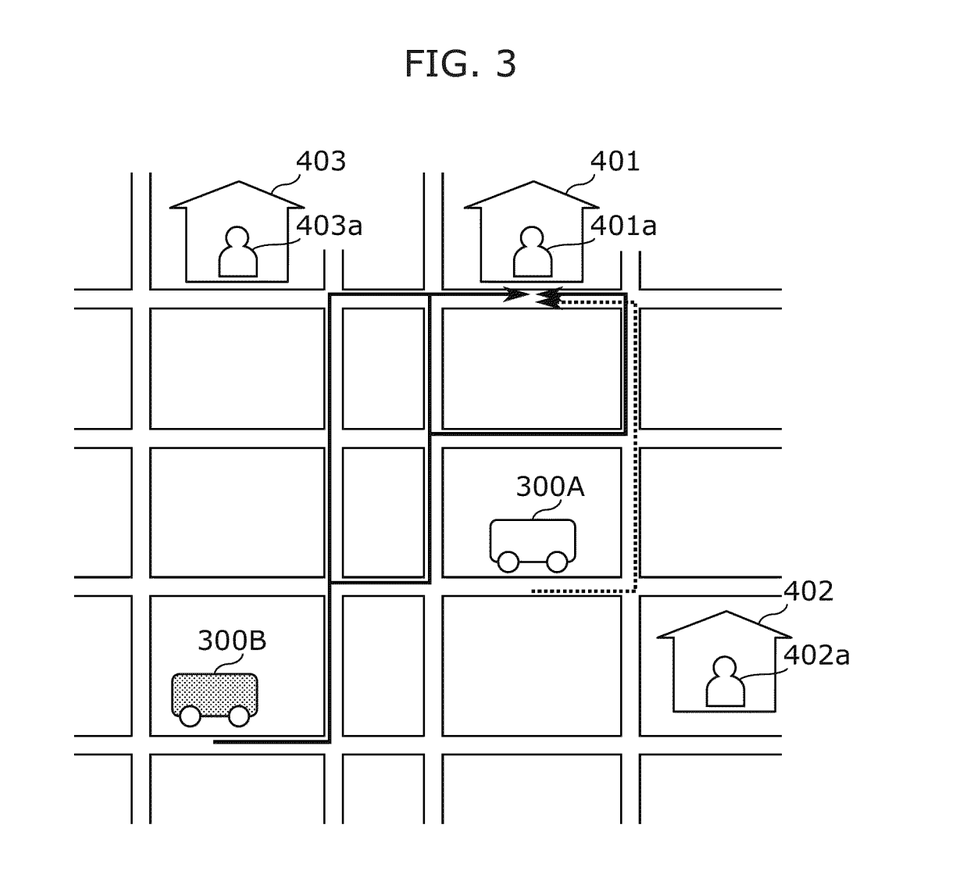
FIG. 3 is a schematic diagram illustrating travel routes of a second mobile object according to the embodiment.

FIG. 3 is a schematic diagram illustrating travel routes of the second mobile object according to the embodiment. As an example, FIG. 3 illustrates a travel route (broken line) of the first mobile object that has received the travel instruction and routes (solid lines) that are candidate travel routes of second mobile object 300B. Moreover, here, first arrival point 401 where first user 401a is located, second arrival point 402 where second user 402a is located, and third arrival point 403 where third user 403a is located are illustrated. The first to third users are scheduled to receive articles from first mobile object 300A in ascending order of the ordinal numbers. At this moment, first mobile object 300A is moving toward first user 401.

As illustrated in the drawing, while first mobile object 300A is moving toward first user 401 prior to second mobile object 300B, second mobile object 300B starts to move in preparation for a request to move second mobile object 300B occurring after first mobile object 300A arrives at first arrival point 401a. Multiple routes branching off at each intersection on the routes and eventually leading to first arrival point 401a can be considered as candidate travel routes of second mobile object 300B.

The operation of the information output device and the like according to this embodiment will now be described with reference to FIGS. 4 to 7 in addition to FIG. 3.

Figure 4:
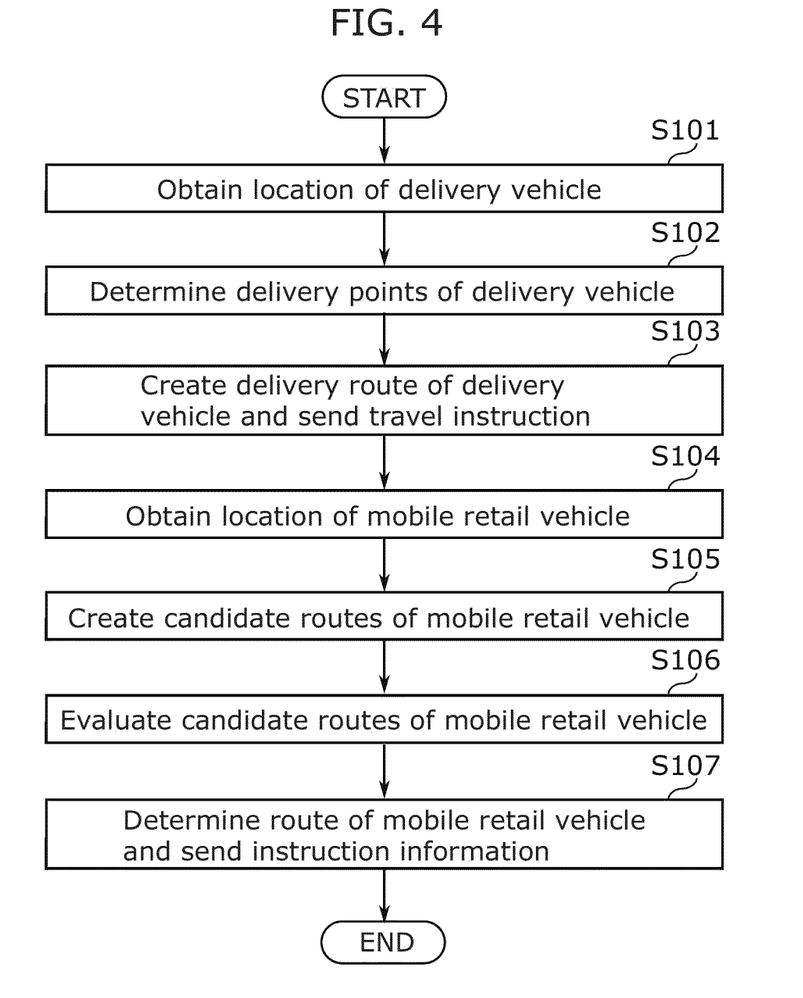
FIG. 4 is a flowchart illustrating operation of the mobile object control system according to the embodiment.

FIG. 4 is a flowchart illustrating the operation of the mobile object control system according to the embodiment. First, delivery vehicle state manager 101 obtains the location of first mobile object 300A (that is, delivery vehicle) by obtaining the vehicle state from first mobile object 300A (S101). Moreover, delivery destination manager 102 determines delivery points (also referred to as "delivery destinations") of first mobile object 300A by reading out the delivery destination data from delivery destination data storage 121 (S102). Subsequently, delivery route manager 103 creates a travel instruction including a delivery route of first mobile object 300A and sends the travel instruction to first mobile object 300A (S103).

On the other hand, mobile retail vehicle state manager 111 obtains the location of second mobile object 300B (that is, mobile retail vehicle) by obtaining the vehicle state from second mobile object 300B (S104). Subsequently, mobile retail vehicle candidate route calculator 113 creates candidate routes of second mobile object 300B (S105). The created candidate routes include, for example, several different (multiple) routes branching off at each intersection on the road. Mobile retail vehicle route evaluator 114 evaluates each of the created candidate routes (S106).

The evaluation of the routes will now be described in more detail. In the example illustrated in FIG. 3, first mobile object 300A moves to second arrival point 402 after first arrival point 401. In a case where first user 401a does not submit a request to move second mobile object 300B and where second user 402a submits a request to move second mobile object 300B, the movement of second mobile object 300B may be "wasted" if second mobile object 300B moves too close to first arrival point 401.

Figure 5:
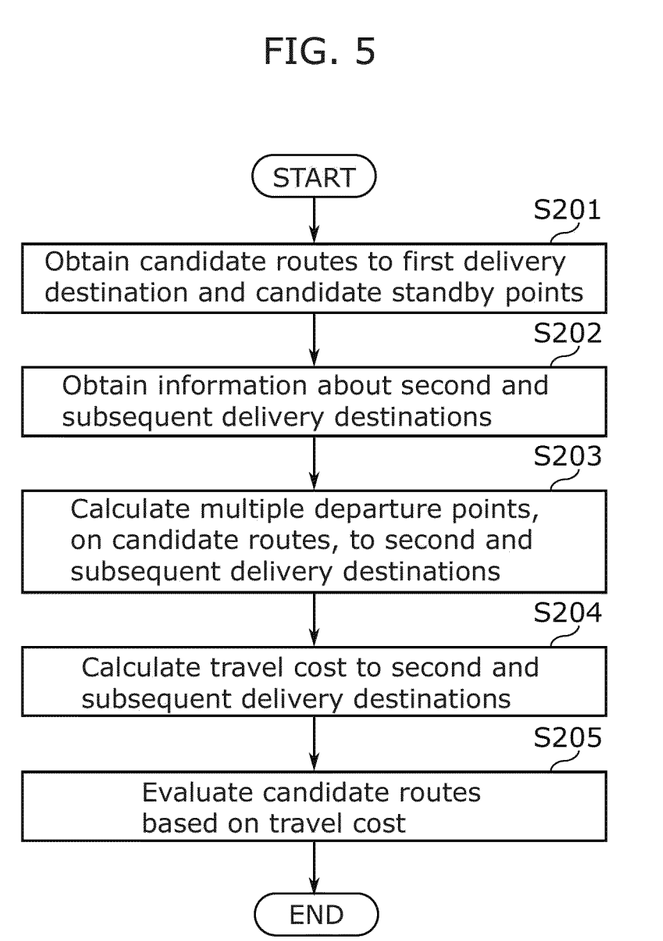
FIG. 5 is a flowchart illustrating evaluation of candidate routes according to the embodiment.

Accordingly, in this embodiment, candidate travel routes are evaluated also in consideration of two or more points at which first mobile object 300A is scheduled to arrive after first arrival point 401, such as second arrival point 402, third arrival point 403, . . . , to which first mobile object 300A moves after first arrival point 401. Specifically, FIG. 5 is a flowchart illustrating the evaluation of the candidate routes according to the embodiment.

First, mobile retail vehicle route evaluator 114 obtains the candidate travel routes (routes to a first delivery destination that is first arrival point 401) of second mobile object 300B calculated by mobile retail vehicle candidate route calculator 113 and candidate standby points (S201). The candidate standby points are set at intersections on the road, midpoints between intersections on straight paths, and the like. The cost of travel from a standby point (an example of a second point) either to first arrival point 401 or to second arrival point 402 can be kept relatively low, and second mobile object 300B waiting at the standby point can arrive at first arrival point 401 and second arrival point 402 relatively quickly (for example, within a predetermined period).

The standby point is a point that allows second mobile object 300B to arrive at the first arrival point before the predetermined period of time passes after the arrival of first mobile object 300A at first arrival point 401. Accordingly, second mobile object 300B may wait for a request to move at a point sufficiently close to the first arrival point, or the standby point may be changed little by little to move according to the closeness corresponding to the elapsed time from the arrival of first mobile object 300A at first arrival point 401.

Note that the travel cost is the time required for moving. However, the travel cost may be fuel consumption during moving or travel distance according to the circumstances. The viewpoint of fuel or distance is used for selecting more profitable routes in a case where each of the multiple candidate routes allows arrival well before a predetermined time.

Next, mobile retail vehicle route evaluator 114 obtains information about a second delivery destination and subsequent delivery destinations to which deliveries are performed after the first delivery destination (S202). For each candidate route selected to be evaluated, mobile retail vehicle route evaluator 114 calculates multiple departure points (branch points) at which the route branches off to second arrival point 402 from the route to first arrival point

401 (S203). Mobile retail vehicle route evaluator 114 calculates the cost of travel from the departure points to second arrival point 402 (S204) and integrates the cost of travel from each departure point to second arrival point 402 for each candidate route. For example, integrated value $C_{xn}$ of the travel cost can be calculated using expression (1) below.

[Expression 1]

$$C_{xn} = \int \{TB(y, U_x) - TA(U_x)\}dy \cong \frac{\sum TB(y, U_x)}{n_y} - TA(U_x) \quad (1)$$

In the expression above, $U_x$ indicates user x located at an xth arrival point at which first mobile object 300A is scheduled to arrive at an xth stop; $TB(y, U_x)$ indicates time at which second mobile object 300B departing from point y on a route arrives at user x, that is, the xth arrival point; $TA(U_x)$ indicates time at which first mobile object 300A arrives at user x, that is, the xth arrival point; and $n_y$ indicates the number of points y on the route of second mobile object 300B.

The integrated values of the travel cost of the candidate routes calculated in this manner can be used as evaluation values of the candidate routes. That is, mobile retail vehicle route evaluator 114 calculates the integrated values of the travel cost as the evaluation values to evaluate the candidate routes on the basis of the travel cost (S205). As described above, lower travel cost indicates more appropriate routes. Thus, a route with the lowest evaluation value may be selected as a travel route by comparing the evaluation values calculated for each candidate route.

Figure 6:
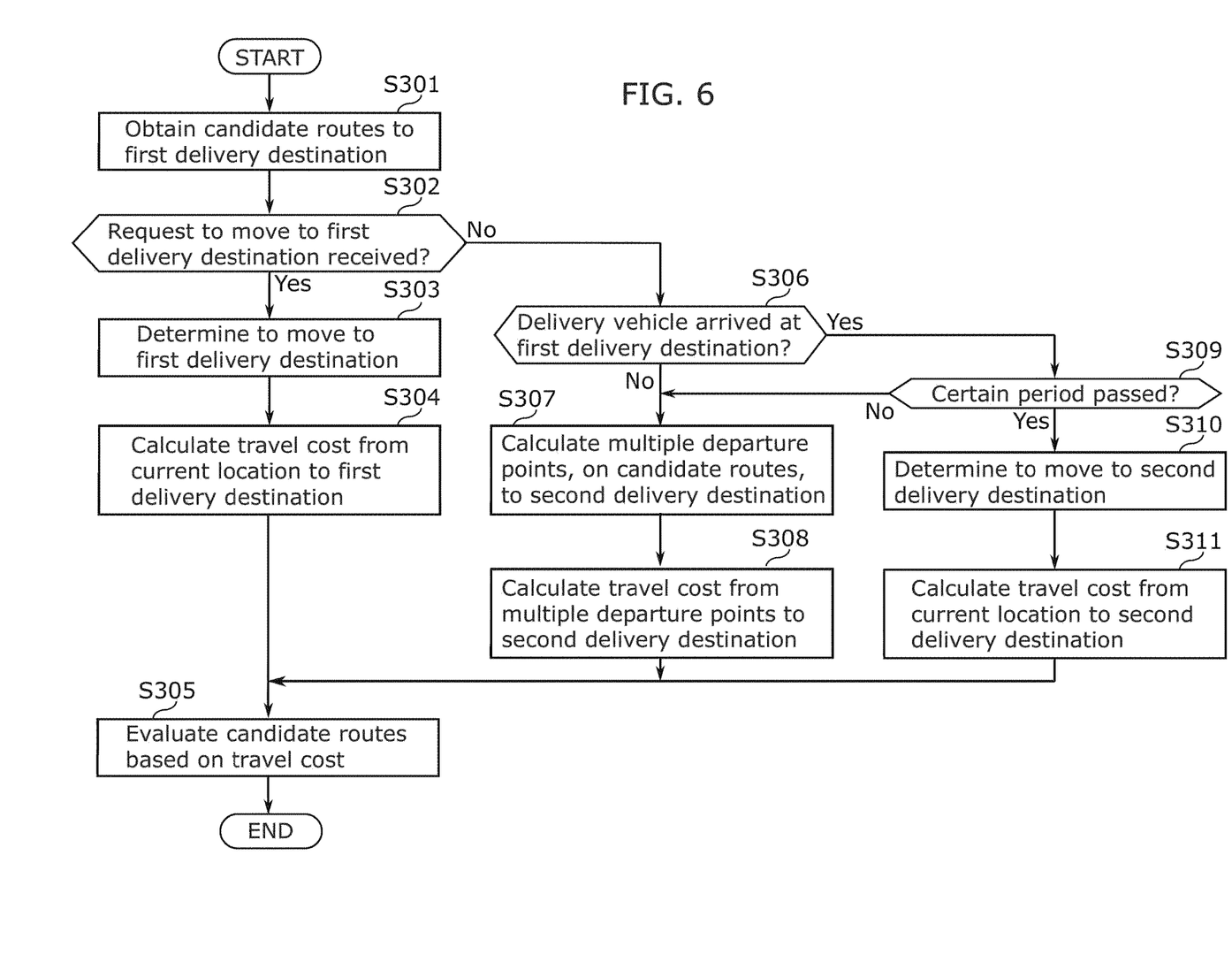
FIG. 6 is a flowchart illustrating selection of a travel route based on the arrival of a first mobile object at a first arrival point according to the embodiment.

Moreover, FIG. 6 is a flowchart illustrating selection of the travel route based on the arrival of the first mobile object at the first arrival point according to the embodiment. As illustrated in the drawing, mobile retail vehicle route evaluator 114 obtains the candidate routes that take second mobile object 300B to the first delivery destination that is first arrival point 401 (S301). Next, mobile retail vehicle route evaluator 114 determines whether a request to move second mobile object 300B to first arrival point 401 is received before first mobile object 300A arrives at the first delivery destination that is first arrival point 401 (S302). Upon determining that a request to move second mobile object 300B to first arrival point 401 is received (Yes in S302), mobile retail vehicle route evaluator 114 determines to move second mobile object 300B to first arrival point 401 (S303) and calculates the cost of travel from the current location to first arrival point 401 (S304). Subsequently, mobile retail vehicle route evaluator 114 evaluates the candidate routes on the basis of the travel cost (S305) and ends the process.

On the other hand, upon determining that no request to move second mobile object 300B to first arrival point 401 is received (No in S302), mobile retail vehicle route evaluator 114 further determines whether first mobile object 300A has arrived at the first delivery destination that is first arrival point 401 (S306). Upon determining that first mobile object 300A has not arrived at the first delivery destination that is first arrival point 401 (No in S306), mobile retail vehicle route evaluator 114 calculates multiple departure points, on the candidate routes, to the second delivery destination that is the second arrival point (S307). Subsequently, mobile retail vehicle route evaluator 114 calculates the cost of travel from the multiple departure points to second arrival point 402 (S308). Subsequently, mobile retail vehicle route evaluator 114 evaluates the candidate routes on the basis of the travel cost (S305) and ends the process.

On the other hand, upon determining that first mobile object 300A has arrived at the first delivery destination that is first arrival point 401 (Yes in S306), mobile retail vehicle route evaluator 114 determines whether a certain period has passed since the arrival of first mobile object 300A (S309). If it is determined that the certain period has not passed since the arrival of first mobile object 300A (No in S309), the process proceeds to step S307. On the other hand, upon determining that the certain period has passed since the arrival of first mobile object 300A (Yes in S309), mobile retail vehicle route evaluator 114 determines to move second mobile object 300B to second arrival point 402 (S310) and calculates the cost of travel from the current location to second arrival point 402 (S311). Subsequently, mobile retail vehicle route evaluator 114 evaluates the candidate routes on the basis of the travel cost (S305) and ends the process.

In this manner, as the routes to first arrival point 401, the destination to which second mobile object 300B moves and the method of calculating the travel cost may be changed on the basis of the temporal relationship between the timing at which first mobile object 300A arrives at first arrival point 401 and the timing at which the request to move second mobile object 300B to first arrival point 401 is received from the user located at first arrival point 401. As a result, the route selected from the multiple candidate routes from the current location to the first arrival point may be changed.

The candidate routes of second mobile object 300B are evaluated in the above-described manner. Returning to FIG. 4, the route of second mobile object 300B is determined on the basis of the evaluation result, and the instruction information is sent to second mobile object 300B (S107). The travel route determined in this manner allows second mobile object 300B to arrive at first arrival point 401, for example, within the predetermined period and also at second arrival point 402 relatively quickly. This increases the possibility of arrival of second mobile object 300B before the user reconsiders the service provided by second mobile object 300B, giving the user more opportunities to use the service provided by second mobile object 300B while improving user convenience. In this manner, the information output method and the like according to this embodiment can output information for appropriately determining routes along which mobile objects travel.

Although an information output method and the like according to one or more aspects have been described above on the basis of the foregoing embodiment, this embodiment is not intended to limit the present disclosure. The scope of the one or more aspects may encompass forms obtained by various modifications, to this embodiment, that can be conceived by those skilled in the art and forms obtained by combining elements in different embodiments without departing from the spirit of the present disclosure.

Figure 7:
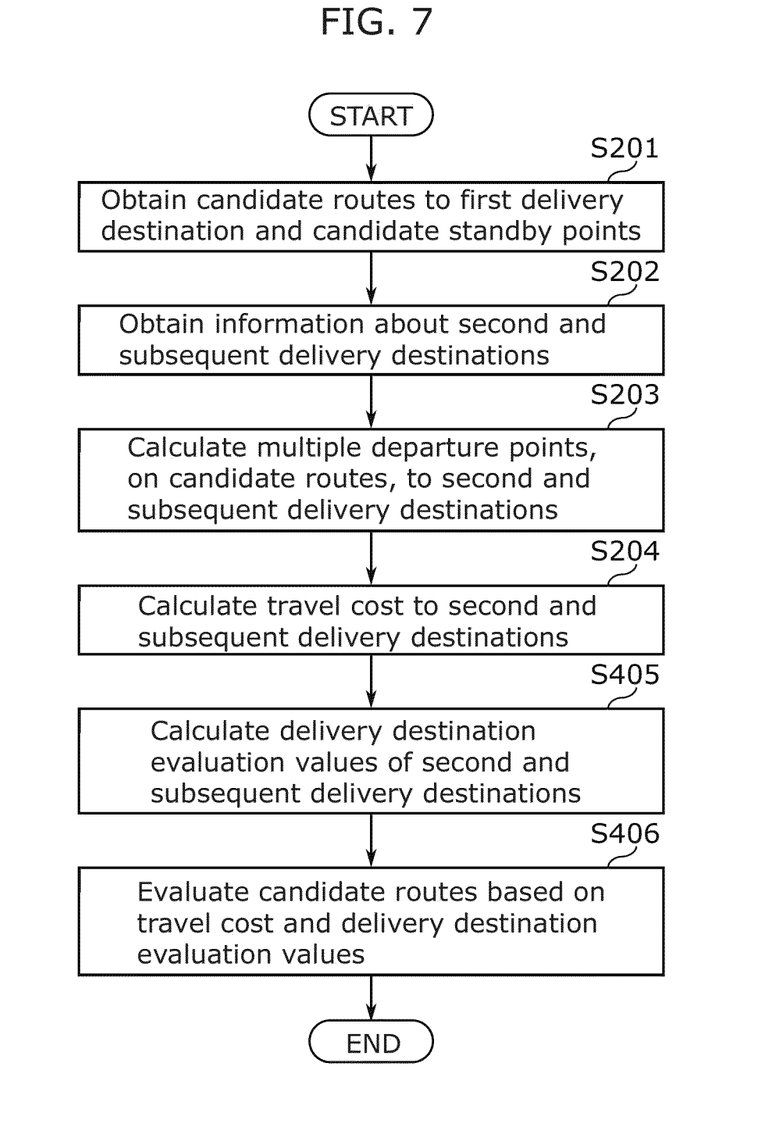
FIG. 7 is a flowchart illustrating evaluation of candidate routes according to a variation of the embodiment.

For example, arrival points after the second arrival point may further be taken into consideration. At this moment, a system configuration that includes a server apparatus in which users who use the service provided by second mobile object 300B are registered through a registration system and that allows the past activity histories of the users to be considered further enables selection of travel routes with characteristics of the users located at various points, such as the second arrival point and the third arrival point, taken into consideration. An example will be described with reference to FIG. 7. FIG. 7 is a flowchart illustrating evaluation of candidate routes according to a variation of the embodiment. Here, differences from the flowchart illustrated in FIG. 5 will be described. Similar points are given the same reference signs as those in FIG. 5, and descriptions thereof will be omitted.

In a mobile object control system according to the variation, the evaluation value of the travel cost for each point after the arrival at the second arrival point is calculated after step S204. The calculation of the evaluation value at this moment differs from that in the above-described embodiment. Specifically, in this variation, evaluation value Fn is calculated after step S204 (S405). Expressions (2) to (4) below are used for the calculation of evaluation value Fn.

[Expression 2]
$$F_n = \sum_x j_x f_{x,n} \quad (2)$$

[Expression 3]
$$f_{x,n} = \frac{O_x}{C_{xn}} \quad (3)$$

[Expression 4]
$$O_x = \frac{\sum M_x}{k} \quad (4)$$

Here, $f_{x,n}$ in the expressions above is an evaluation value per user calculated for user x on certain route n. That is, evaluation value $F_n$ of route n is expressed as a total sum of the evaluation values, per user, of all the users. That is, routes with high evaluation values as a whole are selected without giving priority only to a certain user. At this moment, although all the evaluation values per user may be treated equally, the order in which first mobile object 300A visits for delivery may be taken into consideration. $j_x$ in the expression above indicates a weighting factor, obtained by taking the order of delivery and the like into consideration, by which the evaluation values per user are multiplied. The weighting factor is set such that delivery destinations closer, in the order, to the arrival point to which first mobile object 300A performs deliveries next are given priority or such that delivery destinations to which the delivery vehicle performs deliveries in a shorter time are given priority. Moreover, $O_x$ in the expressions above indicates a purchase expectation value calculated from past purchase histories of multiple users located at respective points. Accordingly, users with higher purchase expectation values are given higher priority over users with lower purchase expectation values. For example, as indicated in expression (4), purchase expectation value $O_x$ is calculated as, for example, an average purchase amount per dispatch of the mobile retail vehicle, obtained by dividing a total sum of payment $M_x$ for articles previously purchased by user x through the mobile retail vehicle by number k of times that user x has requested the dispatch of the mobile retail vehicle.

Note that, in a case where the evaluation values are calculated only from the purchase expectation value of each user, expression (3) above may be defined as $f_{x,n}=O_x$. In this case, expression (2) above is calculated as a total sum of $J_x O_x$ for each user x.

Moreover, the functions of the server apparatus in the above-described embodiment may be allocated in any devices. For example, the mobile objects may be provided with all the functions of the server apparatus.

Moreover, in the above-described embodiment, the elements may be configured by dedicated hardware or achieved by executing software programs suitable for the elements. The elements may be achieved as a program executor, such as a CPU or a processor, reads out and executes software programs stored in a recording medium, such as a hard disk or semiconductor memory. Here, the software that implements the information output device and the like according to the above-described embodiment is the following program.

That is, the program causes a computer to execute the information output method.

INDUSTRIAL APPLICABILITY

The present disclosure is available to, for example, determine travel routes of mobile objects that autonomously travel.

The invention claimed is:

1. An information output method executed by an information output device, the information output method comprising:
    obtaining first information about a first time at which a first mobile object arrives at a first point;
    determining, based on the first information, a second point from which a second mobile object can arrive at the first point at a second time within a predetermined period from the first time; and
    outputting instruction information for moving the second mobile object to the second point, the second mobile object performing a movement operation in accordance with the instruction information.

2. The information output method according to claim 1, wherein
    the first mobile object is loaded with a first article scheduled in advance to be delivered to the first point, and
    the second mobile object is loaded with a second article expected to be purchased by a user.

3. The information output method according to claim 1, wherein
    the instruction information includes route information about a location of the first point, a location of the second point, and a route from a current location to the first point via the second point.

4. The information output method according to claim 3, wherein
    the route to the first point is selected from a plurality of candidate routes from the current location to the first point via the second point, based on information about one or more points at which the first mobile object is scheduled to arrive after the first point.

5. The information output method according to claim 4, wherein
    as the route to the first point, a candidate route with lowest travel cost is selected from the plurality of candidate routes from the current location to the first point via the second point, the travel cost being required for the second mobile object to arrive at at least one of the one or more points at which the first mobile object is scheduled to arrive after the first point.

6. The information output method according to claim 3, wherein
    the route to the first point is selected from a plurality of candidate routes from the current location to the first point via the second point, based on information about arrival of the first mobile object at the first point.

7. The information output method according to claim 6, wherein
    the route to the first point is selected from the plurality of candidate routes from the current location to the first point via the second point, based on a temporal relationship between a timing at which the first mobile object arrives at the first point and a timing at which a request to move the second mobile object to the first point is received from a user located at the first point.

8. The information output method according to claim 3, wherein
the route to the first point is selected from a plurality of candidate routes from the current location to the first point via the second point, based on information about past purchase histories of a plurality of users respectively located at two or more points at which the first mobile object is scheduled to arrive.

9. The information output method according to claim 8, wherein
as the route to the first point, a candidate route with lowest travel cost is selected from the plurality of candidate routes from the current location to the first point via the second point, the travel cost being required for the second mobile object to arrive at a point where a user with a highest purchase expectation value is located, the purchase expectation value being calculated from the past purchase histories of the plurality of users respectively located at the two or more points at which the first mobile object is scheduled to arrive.

10. The information output method according to claim 1, wherein
the instruction information further includes information about a standby period during which the second mobile object stops moving at the second point to enable the second mobile object to arrive at the first point at the second time.

11. The information output method according to claim 1, wherein
the second mobile object is selected from a plurality of mobile objects, based on a state of the first mobile object.

12. The information output method according to claim 1, wherein
the first mobile object presents information about a service provided by the second mobile object to a user located at the first point when the first mobile object arrives at the first point.

13. The information output method according to claim 12, wherein
when a request to move the second mobile object to the first point in response to the information presented by the first mobile object that has arrived at the first point is received from the user located at the first point to provide the user with the service, the instruction information further including information for moving the second mobile object to the first point is output.

14. The information output method according to claim 13, wherein
when the request to move the second mobile object to the first point in response to the information presented by the first mobile object that has arrived at the first point is not received from the user located at the first point within a certain period, the instruction information for moving the second mobile object to the first point is discarded.

15. The information output method according to claim 1, wherein
the predetermined period is a period determined according to at least one of a type of a service provided by the second mobile object or a characteristic of a user located at the first point, and is a period after the user located at the first point submits a request to move the second mobile object to the first point after the first time to provide the user with the service and before the user located at the first point reconsiders provision of the service.

16. A non-transitory computer-readable recording medium having recorded thereon a program for causing a computer to execute the information output method according to claim 1.

17. A mobile object control system comprising:
the information output device that executes the information output method according to claim 1;
the first mobile object; and
the second mobile object.

18. The mobile object control system according to claim 17, wherein the second mobile object includes a driven unit driven by a motor and the driven unit performs the movement operation in accordance with the instruction information.

19. The information output method according to claim 1, wherein the second mobile object includes a driven unit driven by a motor.

20. The information output method according to claim 19, wherein the driven unit performs the movement operation in accordance with the instruction information.

\* \* \* \* \*